United States Patent
Engel et al.

(10) Patent No.: US 12,358,214 B2
(45) Date of Patent: Jul. 15, 2025

(54) MONITORING AND PROCESS CONTROL OF THE ADDITIVE MANUFACTURE OF A WORKPIECE

(71) Applicant: SIEMENS AKTIENGESELLSCHAFT, Munich (DE)

(72) Inventors: Thomas Engel, Aalen (DE); Matthias Goldammer, Munich (DE); Andreas Graichen, Norrköping (SE); Clemens Otte, Munich (DE); Axel Reitinger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 832 days.

(21) Appl. No.: 17/432,316

(22) PCT Filed: Feb. 13, 2020

(86) PCT No.: PCT/EP2020/053683
§ 371 (c)(1),
(2) Date: Aug. 19, 2021

(87) PCT Pub. No.: WO2020/169433
PCT Pub. Date: Aug. 27, 2020

(65) Prior Publication Data
US 2022/0168840 A1 Jun. 2, 2022

(30) Foreign Application Priority Data
Feb. 19, 2019 (EP) .................................... 19158124

(51) Int. Cl.
*B23K 26/03* (2006.01)
*B22F 10/28* (2021.01)
(Continued)

(52) U.S. Cl.
CPC .......... *B29C 64/153* (2017.08); *B22F 10/366* (2021.01); *B22F 12/44* (2021.01);
(Continued)

(58) Field of Classification Search
CPC ...... B23K 26/034; B23K 26/34; B33Y 10/00; B33Y 50/02; B33Y 30/00; B22F 12/44; B22F 12/49
See application file for complete search history.

(56) References Cited

U.S. PATENT DOCUMENTS

2009/0206065 A1* 8/2009 Kruth .................... B29C 64/393
219/121.65
2016/0184893 A1 6/2016 Dave et al.
(Continued)

FOREIGN PATENT DOCUMENTS

CN 107107481 A 8/2017
CN 107877855 A 4/2018
(Continued)

OTHER PUBLICATIONS

PCT International Search Report and Written Opinion of International Searching Authority mailed Apr. 7, 2020 corresponding to PCT International Application No. PCT/EP2020/053683.

*Primary Examiner* — Thien S Tran
(74) *Attorney, Agent, or Firm* — LEMPIA SUMMERFIELD KATZ LLC

(57) ABSTRACT

In order to allow real-time monitoring of a tracing process during additive manufacture, a device is disclosed for the additive manufacture of a workpiece. A scanning unit (2) is designed to direct a fusing beam (3) onto a tracing spot (4). The device also has a local-resolution optical detector (5), a control unit (6) and an imaging unit (7). The imaging unit (7) is designed to image a portion (8) of the tracing surface (1) on the detector (5). The control unit (6) is designed to control the device in order to change the position of the portion (8) during manufacture.

12 Claims, 5 Drawing Sheets

(51) Int. Cl.
  *B22F 10/31* (2021.01)
  *B22F 10/366* (2021.01)
  *B22F 10/38* (2021.01)
  *B22F 10/85* (2021.01)
  *B22F 12/44* (2021.01)
  *B22F 12/49* (2021.01)
  *B22F 12/90* (2021.01)
  *B23K 26/34* (2014.01)
  *B29C 64/153* (2017.01)
  *B33Y 10/00* (2015.01)
  *B33Y 30/00* (2015.01)
  *B33Y 50/02* (2015.01)

(52) U.S. Cl.
  CPC .............. *B22F 12/49* (2021.01); *B22F 12/90* (2021.01); *B23K 26/034* (2013.01); *B23K 26/34* (2013.01); *B33Y 10/00* (2014.12); *B33Y 30/00* (2014.12); *B33Y 50/02* (2014.12); *B22F 10/28* (2021.01); *B22F 10/31* (2021.01); *B22F 10/38* (2021.01); *B22F 10/85* (2021.01)

(56) References Cited

U.S. PATENT DOCUMENTS

| | | |
|---|---|---|
| 2016/0185048 A1 | 6/2016 | Dave et al. |
| 2017/0368640 A1 | 12/2017 | Herzog et al. |
| 2018/0093416 A1 | 4/2018 | Prexler et al. |
| 2018/0120260 A1 | 5/2018 | Goldfine et al. |
| 2019/0217422 A1* | 7/2019 | Kramer ................ B23K 26/042 |

FOREIGN PATENT DOCUMENTS

| | | | | |
|---|---|---|---|---|
| DE | 102012221218 A1 | | 5/2013 | |
| DE | 102013008085 A1 | * | 11/2014 | ........... B23K 26/032 |
| DE | 102015207834 A1 | * | 11/2016 | |
| DE | 102016001355 A1 | * | 8/2017 | .............. B22F 10/28 |
| WO | 2019032687 A1 | | 2/2019 | |

\* cited by examiner

MONITORING AND PROCESS CONTROL OF THE ADDITIVE MANUFACTURE OF A WORKPIECE

This application is the National Stage of International Application No. PCT/EP2020/053683, filed Feb. 13, 2020, which claims the benefit of European Patent Application No. EP 19158124, filed Feb. 19, 2019. The entire contents of these documents are hereby incorporated herein by reference.

BACKGROUND

The present embodiments relate to a device for additive manufacture of a workpiece, a method for monitoring the additive manufacture of a workpiece, a method for process control of the additive manufacture of a workpiece, and a corresponding computer program.

The document US 2016/0184893 A1 describes monitoring of additive manufacturing processes (e.g., in the case of selective laser melting) using a pyrometer or a photodiode.

In the case of known methods for the monitoring of an additive manufacturing method, it is often difficult or impossible to detect defects or imperfections that already impair the tracing process.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved concept for the additive manufacture of a workpiece that allows real-time monitoring of the tracing process in order to be able to detect defects or flaws already during the tracing process is provided.

The present embodiments are based on the idea of providing a spatially resolving detector for monitoring a tracing surface and of dynamically changing a position of a subregion of the tracing surface observed by the detector during manufacture.

According to a first aspect of the present embodiments, a device for the additive manufacture of a workpiece is provided. The device has a scanning unit that is configured to direct a fusing beam onto a tracing point on a tracing surface. The device also has an optical detector, a control unit, and an imaging unit. The detector is formed as a spatially resolving detector, and the imaging unit is configured and arranged to image a subregion of the tracing surface at least two-dimensionally by the detector. The control unit is configured to activate the device (e.g., the imaging unit or the scanning unit) to change a position of the subregion during manufacture.

The fusing beam may be, for example, a light beam (e.g., laser beam), an electron beam or some other energy beam that is suitable for additive manufacture (e.g., for selective additive manufacture).

The tracing surface may be, for example, a surface or part of the surface of a powder bed from which the workpiece is manufactured. The tracing surface may include part of the powder bed surface and part of a workpiece surface. The tracing surface may be the workpiece surface or part of the workpiece surface (e.g., in the case of manufacturing methods without a powder bed), in which, for example, material is applied directly to the workpiece surface and is fused.

The additive manufacture may be an additive manufacturing method (e.g., a selective additive manufacturing method, such as electron beam melting, selective laser melting (SLM) or selective laser sintering (SLS)).

The detector may be for example, a camera, a camera detector, or a camera sensor, or a camera may include the detector.

That the detector is formed as a spatially resolving detector may provide that the detector has multiple pixels (e.g., an array of pixels). For example, the detector may contain several 1,000 pixels (e.g., an array with a number of pixels in the range of 100,000 pixels to 10,000,000 pixels).

The use of such a spatially resolving detector allows the subregion to be imaged quickly, with high resolution and with high quality.

The imaging of the subregion on the detector takes place, for example, in the visible and/or infrared range. Correspondingly, the detector is sensitive in the visible and/or infrared range.

Here and hereinafter, the term "light" may be understood as including electromagnetic waves in the visible range, in the infrared range, and/or in the ultraviolet range. Accordingly, the term "optical" may be understood as relating to light according to this understanding.

The scanning unit, which may also be referred to as the scan unit or deflecting unit, serves, for example, for deflecting the fusing beam in a controlled way, and thereby controlling the tracing point on the tracing surface in order to carry out the selective manufacture of the workpiece according to a defined work order (e.g., according to a defined work program).

The two-dimensional imaging of the subregion may be two-dimensional imaging. For example, a surface of the subregion is not necessarily planar or flat, which may have the effect that in the subregion there are different heights, (e.g., of the powder bed). In other words, there is a topography.

The at least two-dimensional imaging of the subregion may also be understood as two-and-a-half-dimensional imaging, in the sense that, apart from coordinates that lie in a base plane of the tracing surface or of the powder bed, associated items of topography information (e.g., height information) are recorded by the imaging onto the detector. In this case, the term "two-and-a-half-dimensional" may be understood such that the third dimension is available to the two-dimensional plane coordinates as an attribute or function. For each pair of Cartesian plane coordinates, in a two-and-a-half-dimensional model, there exists precisely one height coordinate. Consequently, for example, vertical walls or overhangs or hollow spaces that would require complete 3D imaging cannot be recorded using a two-dimensional imaging.

The at least two-dimensional imaging of the subregion may also be a three-dimensional imaging.

According to at least one embodiment, the subregion does not cover the entire tracing surface or the entire powder bed. The subregion is therefore smaller than an entire working region. As a result, the achievable spatial resolution and the corresponding imaging quality and image quality are further increased.

The position of the subregion may be changed by being activated by the control unit, in that a deflection of imaging beams or imaging light for the imaging of the subregion is deflected by the scanning unit synchronously with the fusing beam. This is the case, for example, in embodiments in which the imaging beam or the imaging light is coupled into a beam path of the fusing beam.

As an alternative or in addition, the changing of the position of the subregion may take place by being activated by the imaging unit (e.g., activated by the control; in embodiments in which the camera includes its own dynamic system for changing its image region).

According to various embodiments, the described acts of the method are repeated after changing the position of the subregion. This allows monitoring of the tracing surface (e.g., a region around the tracing point) directly at the time of manufacture (e.g., in real time; also referred to as "online" monitoring).

According to various embodiments, the tracing point lies within the subregion (e.g., the tracing point always lies in the subregion during the additive manufacture), which provides that the subregion is changed such that the subregion follows a movement of the tracing point, or vice versa.

Due to the spatially resolved observation and imaging of the restricted subregion in comparison with the entire tracing surface, and due to the dynamic changing of the position of the subregion, qualitatively high-grade records of relevant regions on the tracing surface (e.g., regions around the tracing point) are recorded in real time, or almost in real time, during manufacture and are made available. These records may be used for assessing or monitoring the manufacturing progress, the manufacturing quality, or other manufacturing parameters, (e.g., visual and/or thermal assessment). The assessment may be performed, for example, by humans or in a computer-aided or fully automatic manner.

The use of an extended array of pixels makes quicker and more efficient imaging of relevant regions possible than would be the case, for example, with a point-like detector, which ultimately makes real-time observation, or almost real-time observation, possible in the first place.

The assessment of the additive manufacture may, for example, include the observing or identifying of defects or possible defects or of flaws (e.g., directly before the tracing point). The assessing or observing may also include a detection of elevations, defects, spatter, debris, and so forth on the tracing surface, while these may occur, for example, during the manufacturing process or a subsequent coating process. For example, they may occur during an earlier tracing process of adjacent structures in the surrounding area of the current tracing point. According to the improved concept, it is possible to adequately address and respond to such disturbances and flaws.

For example, using a device according to the improved concept, the assessment or observation of the manufacturing process may be used to the extent that elevations and other faults or imperfections are taken into account in a coating process following manufacture or included in manufacture.

According to at least one embodiment of the device, the scanning unit has a beam splitter that is arranged on an input side of the scanning unit in a beam path of the fusing beam.

The scanning unit has in this case an input side and, for example, an output side. The input side is facing a source of the fusing beam (e.g., a heating, tracing, radiating, electron or laser source), while the output side is facing the tracing surface or the powder bed and the workpiece. Such embodiments are suitable, for example, for methods in which the fusing beam is a laser beam (e.g., for SLS or SLM methods).

The beam splitter is, for example, arranged such that imaging light that impinges on the beam splitter from the tracing surface via the deflecting unit is at least partially coupled out from the beam path of the fusing beam and directed in the direction of the detector.

The scanning unit may act in a way analogous to how it acts on the fusing beam, also on the imaging light or the imaging beam. Accordingly, the observed subregion is always coupled to the fusing beam (e.g., the tracing point).

In various embodiments, the tracing point is located, for example, at a center, or almost at a center, of the subregion. On account of the synchronous deflection of the fusing beam and the imaging beam, the coupling of the subregion to the fusing beam and the tracing point is independent of a current direction or deflection of the fusing beam or a corresponding deflecting state of the scanning unit.

This has the advantage, for example, that, during the changing of the subregion or the position of the subregion, it is automatically provided that the observed subregion is relevant (e.g., is in a direct surrounding area of the tracing point), so that, for example, points that follow the current tracing point in the manufacturing process (e.g., directly follow the current tracing point) already lie in the observed subregion. It is therefore possible to react dynamically and very quickly to corresponding disturbances or imperfections (e.g., almost in real time).

Further, imaging quality close to the center of the array of the detector may be the highest. This is correspondingly utilized in the case of such configurations.

According to at least one embodiment, the device includes a filter (e.g., a dichroic filter) that is arranged at the beam splitter and/or between the beam splitter and the detector.

As a result, a retroactive effect of the fusing beam on the detector image may be minimized or ruled out.

Instead of or in addition to the dichroic filter, narrowband notch filters (e.g., adapted to a laser wavelength of the fusing beam) may be used.

If the fusing beam is a polarized laser beam, a polarizing filter may also be used as the beam splitter.

According to at least one embodiment, the device includes the heat source (e.g., the laser source or the electron beam source).

According to at least one embodiment, the scanning unit includes one or more deflecting mirrors that, using the control unit, serve for directing and deflecting the fusing beam and, in corresponding embodiments, likewise the imaging beam consequently, the directing and deflecting may be used for changing the position of the subregion.

According to at least one embodiment, the imaging unit has one or more actuators that are configured to readjust the detector and/or a lens system of the imaging unit (e.g., by being activated by the control unit) in a way corresponding to a deflection of the fusing beam by the scanning unit for the imaging of the subregion.

A movement of the fusing beam during the imaging of the subregion onto the detector may have the effect, because of the beam deflection, for example, of causing blurring of the image content or instances of unsharpness of the movement, also referred to as "motion blurring." This may be at least partially compensated by the readjusting of the detector or the lens system.

According to at least one embodiment, the device (e.g., the control unit) is configured to couple the imaging of the subregion temporally with a deflection of the fusing beam by the scanning unit, such that a movement of the fusing beam during the imaging of the subregion is prevented or avoided.

This represents an alternative or additional possibility for the avoidance of instances of unsharpness of the movement.

According to at least one embodiment, the device has a light-field camera or a plenoptic camera or a multiple-aperture camera that includes the detector.

In various embodiments of the device, the light-field camera may include a main lens and an array of micro-lenses that is arranged between the main lens and the detector.

The array of micro-lenses may divide a corresponding imaging beam path into subapertures. For each of these subapertures, a separate image with a slightly different viewing angle is then produced, for example, on the detector as a result of the spatial offset of the micro-lenses. The spatial structure of the subregion may then be calculated from the slightly different subimages using methods of triangulation, and two-and-a-half-dimensional or three-dimensional images are produced.

According to at least one configuration, different micro-lenses of the array of micro-lenses have different focal lengths. For example, two or three lens types with different focal lengths may be used for the micro-lenses. This allows a depth measurement to be further improved.

As a difference from conventional triangulation or light-section methods, such as structured-light projection or laser triangulation, a light-field camera offers the advantage that there is no asymmetrical preshaping of the edges (e.g., as a result of a prescribed direction of triangulation due to the structure of the hardware).

According to at least one embodiment, the light-field camera has a lens system with the main lens. The lens system has a focusing device.

According to various embodiments, the focusing device is configured as an autofocusing device.

According to various embodiments, the lens system of the light-field camera is configured as a zoom lens system (e.g., in order to be able to set the magnification or resolution in the subregion of the light-field camera).

The use of the light-field camera (e.g., in embodiments with micro-lenses of different focal lengths) allows a greater depth of field range to be achieved. This makes it possible to partially or fully compensate for an unsharpness that changes, for example, along a direction of a plane of incidence of the imaging beam.

According to at least one embodiment, the evaluating unit is configured to determine at least one item of topographical information of the subregion based on the at least one detector signal.

The topographical information may in this case be determined, for example, from an item of depth information or two-and-a-half-dimensional or three-dimensional information recorded by the light-field camera.

According to at least one embodiment, the evaluating unit is configured to determine a deflecting position (e.g., an actual current deflecting position) of the fusing beam based on the at least one detector signal.

According to at least one embodiment, the device has a focusing unit, that includes, for example, an f-theta lens. The focusing unit is arranged between the scanning unit and the tracing surface or the powder bed and serves for focusing the fusing beam onto the tracing point.

Since, due to the scanning and deflection by the scanning unit, the fusing beam passes through the focusing unit (e.g., an f-theta lens) with different beam inclinations at different points, geometrical aberrations that, for example, cannot be compensated, or not fully, by lens design may occur.

Therefore, embodiments of the device by which an actual deflecting position of the fusing beam may be determined are advantageous. This allows the aberrations to be at least partially compensated.

The fusing beam may not necessarily be perpendicular to a plane of the tracing surface. Use of the light-field camera allows a two-and-a-half-dimensional or three-dimensional record of the subregion to be obtained, which thus allows conclusions to be drawn concerning the deflecting of the fusing beam (e.g., by evaluating a distortion of the subregion or of the image of the subregion in comparison with a perpendicular beam without deflection).

In various embodiments, the device has a spectroscope and/or a spectrometer that is configured and arranged to record light emanating from the tracing surface and generate on the basis thereof a spectrometer signal that includes items of spectrometric or spectroscopic information about the light.

According to various embodiments, the device may include one or more sound sensors, particular structure-borne sound sensors or microphones. The sound sensor is in this case coupled with the workpiece (e.g., arranged directly on the workpiece or is arranged on a support on which the powder bed or the workpiece is located).

Using a sound sensor, for example, sound signals that contain items of information about cracks, spatter, and the like occurring in the workpiece during manufacture may be generated.

According to various embodiments, the device may also include further sensors (e.g., sensors for measuring a mechanical stress in the workpiece).

According to at least one embodiment, the device has an illuminating device that is configured to at least partially illuminate the subregion.

The illuminating device may be configured to illuminate the entire tracing surface or the entire powder bed. The illuminating device may, as an alternative or in addition, be configured to illuminate an illuminating region that includes or partially includes the subregion, in a dynamically variable manner (e.g., coupled with a movement or changing of the subregion).

According to at least one embodiment, the illuminating device (e.g., activated by the control unit) is configured to change the illuminating region (e.g., to change the illuminating region dependent on a position or the changing of the subregion).

The term "illumination" may be understood, for example, as illumination with light (e.g., visible light). A wavelength or a wavelength range of the illumination light or of the light for the illumination is, for example, made to match a sensitivity or a sensitivity spectrum of the detector.

The illumination allows the light available for the imaging of the subregion on the detector, and consequently an image quality of the imaging, to be improved.

According to at least one embodiment, the illuminating device may switch the illumination on and off.

For example, the illuminating device and/or the control unit may be configured such that the illumination is switched off during a thermographic imaging or thermographic examination or recording of the subregion.

In this way, it may be ensured that the thermographic recording is not falsified by the light of the illuminating device.

According to at least one embodiment, the light for the illumination (e.g., the illuminating light and/or an illuminating beam) may be coupled into the beam path of the fusing beam. This allows the position of the illuminating region to be coupled to the subregion, so that changing of the position of the illuminating region may take place synchronously with changing of the position of the subregion.

According to at least one embodiment, the device includes an optical system for beam shaping that is arranged between the illuminating device and the scanning unit or between the illuminating device and the tracing surface or the powder bed.

According to at least one embodiment, a light source of the illuminating device is arranged and configured such that the illuminating device may couple light for the illumination on an input side of the scanning unit into a beam path of the fusing beam.

The light source may, for example, include one or more laser sources and/or one or more light-emitting diodes.

The light sources may, for example, couple directly into the beam path of the fusing beam (e.g., be arranged in a direct surrounding area of the beam path or at an edge of the beam path).

As an alternative or in addition, the device may include a further beam splitter that is arranged between the detector and the beam splitter for coupling out the imaging light or imaging beam. The further beam splitter is arranged, for example, such that the light source of the illuminating device may couple the illuminating light or the illuminating beam into the beam path of the fusing beam via the further beam splitter and the beam splitter.

According to at least one embodiment, at least one further light source of the illuminating device is arranged between the scanning unit and the tracing surface or the powder bed.

The further light source may be arranged, for example, between the f-theta lens and the tracing surface or the powder bed and/or around the f-theta lens or the focusing unit.

The at least one further light source may, for example, be arranged inside a working space (e.g., outside a working space of the device that is closed off or may be closed off), within which the tracing surface and the workpiece are located. For example, the at least one further light source may be arranged between the scanning unit and a covering or a covering window of the working space.

According to such embodiments, the entire working space or a large part or a great part of the working space may be illuminated.

An arrangement outside the working space may protect the further light source from dirt and the like.

According to at least one embodiment, the detector is configured to generate at least one detector signal based on the image of the subregion. The device has an evaluating unit for the evaluation and/or processing of the at least one detector signal.

The evaluation and/or processing of the detector signal may, for example, include a representation of the image of the subregion (e.g., on a display device).

The evaluation and/or processing may also include storing of the detector signal or of items of information or data determined based on the detector signal.

The evaluation and/or processing of the detector signal may also include an evaluation of image data of the image (e.g., for the detection of flaws or for the thermographic assessment or rating).

According to at least one embodiment, the evaluating unit is configured to ascertain at least one thermal characteristic (e.g., for the thermographic recording or evaluation) of the subregion based on the at least one detector signal.

The at least one thermal characteristic may, for example, include a temperature of the tracing surface or of the powder bed in the subregion or a temperature distribution or a temperature profile of the temperature in the subregion.

The at least one thermal characteristic may, as an alternative or in addition, include a cooling behavior or a cooling parameter or a cooling time in the subregion. The thermal characteristic may also include a temperature or temperature distribution at the tracing point or around the tracing point.

The ascertaining of the thermal characteristic based on the at least one detector signal takes place, for example, based on one of the detector signals or a number of the at least one detector signals.

Energy introduced into the powder bed or the workpiece by the fusing beam (e.g., energy introduced into the subregion) may lead to an increase in the temperature of the powder bed or of the workpiece or of the tracing surface in the subregion. Correspondingly, the subregion may radiate energy in the form of thermal radiation and/or in the form of visible light. For example, the subregion may radiate electromagnetic radiation in the visible and/or infrared range (e.g., in the near-infrared range). An intensity of the radiated electromagnetic radiation allows conclusions to be drawn concerning the temperature or temperature distribution or the at least one thermal characteristic.

For example, the subregion may appear as a Lambert radiator or black body or almost as a Lambert radiator or a black body.

A value of the temperature of the subregion may, for example, be proportional to a maximum wavelength of a spectrum of the electromagnetic radiation thermally emitted by the subregion. For example, Wien's displacement law may apply, or approximately apply.

Such thermographic monitoring and observation of the subregion allows a melting behavior of the material to be observed and monitored. In a corresponding way, temperature control may be performed (e.g., by energy control of the fusing beam) in order to control the temperature of the subregion in real time to a desired temperature (e.g., to a constant target temperature). Accordingly, more homogeneous material properties may be achieved, and for example, flaws due to locally excessive temperature or too low a temperature that may, for example, lead to inadequate melting of the material may be avoided.

According to at least one embodiment, the detector has a silicon-based sensor that has a sensitivity at least in the visible range of the near-infrared range (e.g., in a range of 300 nm to 1100 nm).

Sensitivity may be understood, for example, as being a sufficiently high sensitivity to allow imaging of a quality sufficient for the respective purposes.

According to at least one embodiment, the detector has a sensor based on a compound semiconductor (e.g., indium gallium antimonide or zinc selenide. Such sensors are, for example, particularly sensitive in the infrared range.

According to various embodiments, the camera may be formed as a thermoelectric camera for a near-infrared and/or a far-infrared range.

According to at least one embodiment, the camera includes a polarization filter, and/or the detector is formed as a polarization-sensitive detector.

In such embodiments, the evaluating unit may, for example, be configured to ascertain an item of material information of the material of the powder bed or of the workpiece based on the at least one detector signal (e.g., based on an item of polarization information derived or determined from the at least one detector signal). The evaluating unit is, for example, configured to ascertain the at least one thermal characteristic based on or in dependence on the material information.

Different materials or material classes may have different effects on the polarization of the light reflected by the material. Correspondingly, materials may differ based on the polarization information or the material information.

Accordingly, the evaluating unit may, for example, be configured to provide different material-dependent thermal calibrations and to apply a corresponding thermal calibration in the determination and ascertainment of the thermal characteristic.

According to a further aspect of the present embodiments, a device for the additive manufacture of a workpiece is provided. The device has a scanning unit that is configured to direct a fusing beam onto a tracing point on a tracing surface. The device also has a control unit, an imaging unit and a light-field camera with a spatially resolving optical detector. The imaging unit is configured and arranged to image the tracing surface or the powder bed or a subregion of the tracing surface on the detector.

Such embodiments have, for example, the advantages of the light-field camera set out above.

According to a further aspect of the present embodiments, a method for monitoring the additive manufacture of a workpiece is provided. For the manufacture, a fusing beam is directed onto a tracing point on a tracing surface. The method includes recording an at least two-dimensional spatially resolved image of a subregion of the tracing surface, where a position of the subregion is changed during the manufacture. At least one detector signal is generated based on the image. The manufacture of the workpiece is monitored based on the at least one detector signal.

The monitoring may, for example, include observing, evaluating, and/or processing of the image and/or of the detector signals.

According to a further aspect of the present embodiments, a method for process control of the additive manufacture of a workpiece is provided. For this purpose, the manufacture of the workpiece is monitored according to a method based on the present embodiments for monitoring the additive manufacture. At least one thermal characteristic of the subregion is ascertained based on the at least one detector signal. At least one process parameter for the manufacture is fixed or changed dependent on the at least one thermal characteristic.

The fixing or changing of the at least one process parameter may, for example, include the calculating of optimized or updated tracing data for controlling the scanning device.

The fixing or changing of at least one process parameter may also include the generating and/or outputting of an item of information (e.g., an item of status information) with respect to potential faults or deviations from a target parameter during the manufacture.

The fixing or changing of the at least one process parameter may, for example, also include an abnormal termination of the tracing process (e.g., if it is found that a tolerance is exceeded, there is contamination or cracks, or other faults are identified).

The fixing or changing of the at least one process parameter may also include the fixing or changing of a coating parameter (e.g., a layer thickness for the coating of the workpiece), or the fixing or changing of a fusing beam parameter (e.g., a deflecting speed) or energy of the fusing beam.

The fixing or changing of at least one process parameter may also include the fixing or changing of a focusing parameter (e.g., of the focusing unit, such as the f-theta lens).

According to a method for process control according to the present embodiments, therefore, an online or real-time process management (e.g., thermal process management) is made possible. Correspondingly, the influence of faults that may, for example, lead to the usability of the workpiece being restricted or to a risk of failure of the workpiece in later operation, or further problems during the additive manufacture that may occur as a result of thermal inhomogeneities, may be avoided. This therefore allows a thermally particularly stable process to be created and to be reproducibly performed.

According to at least one embodiment, a sound signal is recorded by a sound sensor coupled with the workpiece, and the fixing or changing of the at least one process parameter is carried out dependent on the sound signal.

The sound signal may be used, for example, to determine an item of information concerning possible crack formation in the workpiece or concerning material spatter during manufacture.

According to at least one embodiment, the sound signal is filtered (e.g., high-pass-filtered), and the at least one process parameter is fixed or changed dependent on the filtered sound signal.

The high-pass filtering allows a detected frequency range to be limited in the downward direction, (e.g., in order to largely suppress acoustic disturbances from the surrounding area of the device or from drives).

As an alternative or in addition to the filtering of the sound signal, a microphone that is configured and adapted for high frequency ranges may be used as the sound sensor.

The microphone may, for example, be formed as a piezo microphone, as an optical microphone, or as a microphone with a moving coil.

The microphone may also be formed as a micro-electromechanical system MEMS (e.g., as an optical MEMS).

According to at least one embodiment, a spectrometer signal is generated based on light emanating from the powder bed or the subregion or the tracing surface or the workpiece, and the fixing or changing of the at least one process parameter is carried out dependent on the spectrometer signal.

According to a further aspect of the present embodiments, a computer program is provided, with commands that, during execution of the computer program by a computer system, cause a device according to the present embodiments to carry out a method for monitoring additive manufacture or a method for process control of the additive manufacture according to the present embodiments.

The computer system may, for example, be comprised by the device. The computer system may, for example, include the control unit, the evaluating unit, and/or a further processor unit for carrying out required computing steps.

According to a further aspect of the present embodiments, a computer-readable storage medium (e.g., a non-transitory computer-readable storage medium) is provided, on which a computer program according to the present embodiments is stored.

Further embodiments of the method for monitoring the additive manufacture according to the present embodiments arise directly from the various embodiments and implementations of a device based on the improved concept and vice versa.

Further embodiments of the method for process control according to the present embodiments arise directly from the various embodiments and implementations of the device based on the present embodiments and vice versa.

For example, a device according to the present embodiments may be formed (e.g., programmed) for carrying out a method according to the present embodiments.

BRIEF DESCRIPTION OF THE DRAWINGS

The invention is explained in more detail below based on specific embodiments and associated schematic drawings. In the figures, elements that are the same function or functionally the same are provided with the same reference signs. It may be that the description of elements that are the same or functionally the same is not necessarily repeated in different figures.

DETAILED DESCRIPTION

All of the embodiments of the device and the methods described with respect to the figures may be applied to methods for manufacturing from a powder bed. By analogy, all of the configurations may be applied to methods without a powder bed. A tracing surface then correspondingly takes the place of the powder bed.

Figure 1:
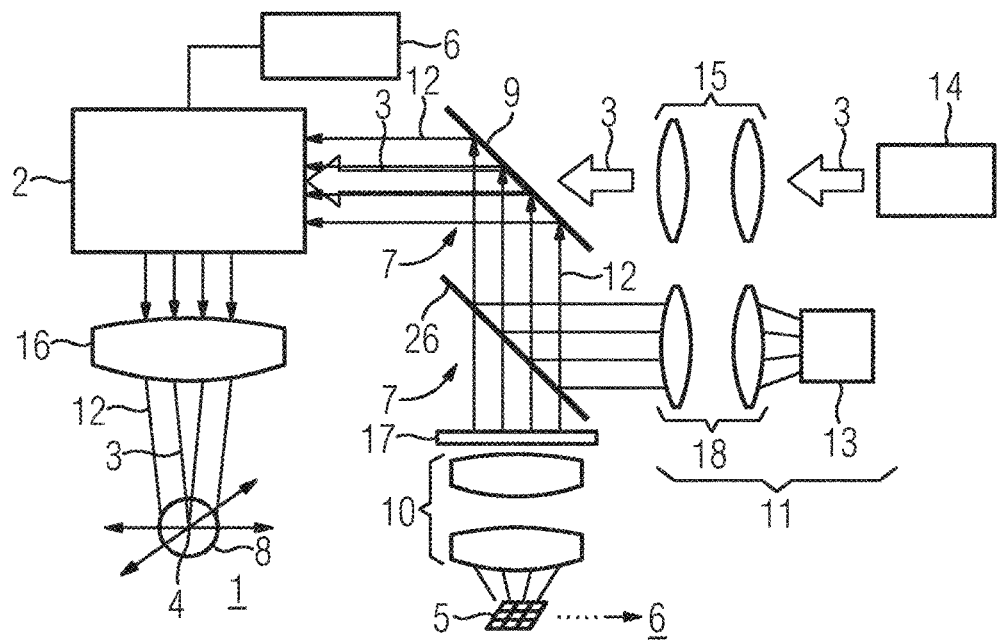
FIG. 1 shows an example embodiment of a device.

In FIG. 1, an embodiment given by way of example of a device according to the improved concept is schematically shown.

The device serves for the additive manufacture of a workpiece (e.g., from a powder bed 1). The powder bed 1 may be arranged in a working space that is, for example, entirely or partially enclosed by a housing (not shown).

A heat source 14 is configured to generate a fusing beam 3, (e.g., a laser beam or an electron beam).

The device includes a scanning unit 2 (e.g., a scan unit) that may receive the fusing beam 3 on an input side that is facing the heat source 14. An optical system 15 for beam shaping of the fusing beam 3 may be optionally arranged between the scanning unit 2 and the heat source 14.

The device also includes a focusing unit 16 that is formed, for example, as an f-theta lens or contains such a lens, and is arranged on the output side with respect to the scanning unit 2 (e.g., between the scanning unit 2 and the powder bed 1). By the focusing unit 16, the fusing beam 3 may be focused and directed onto a tracing point 4 on a surface of the powder bed 1 or of the workpiece. For manufacturing the workpiece, the scanning unit 2 may be activated, for example by a control unit 6 of the device, in order to deflect the fusing beam 3 as required for manufacturing the workpiece according to an order.

The device also has an imaging unit 7, by which a subregion 8 of the powder bed 1 (in the example shown in FIG. 1, a subregion 8 around the tracing point 4) may be imaged onto a detector 5 of the device.

The detector 5 is configured as a spatially resolved detector with an array of light-sensitive sensors and may, for example, be part of a camera. The imaging unit may, for example, include a beam splitter 9 that is arranged between the heat source 14 and the imaging unit 2. The beam splitter 9 allows light that impinges on the beam splitter 9 from the subregion 8 via the imaging unit 2 to be coupled out and directed onto the detector 5.

Optionally, the imaging unit 7 includes a lens system 10 for beam shaping and/or focusing the coupled-out light on the detector 5.

Also optionally, the imaging unit may have a filter 17 that may allow light to which the detector 5 is sensitive to pass and may block or attenuate light that corresponds to a wavelength or a wavelength range of the fusing beam 3.

Optionally, the device may also have an illuminating unit 11 (e.g., with a light source 13 and an optional beam-shaping optical system 18). The illuminating unit 11 is arranged and configured such that the illuminating unit 11 may couple an illuminating light 12 into the beam path of the fusing beam 3 and thereby illuminate an illuminating region on the powder bed 1 that at least partially includes the subregion 8.

In the example shown in FIG. 1, the imaging unit 7 or the illuminating unit 11 has for this purpose a further beam splitter 26 that may couple the illuminating light 12 initially into a beam path of the light for the imaging of the subregion 8 onto the detector 5 and then, for example, via the beam splitter 9 into the beam path of the fusing beam 3.

In the example shown, therefore, both the subregion and the illuminating region are coupled directly to the fusing beam 3 such that, when there is a deflection of the fusing beam 3, the scanning unit 2 synchronously also deflects the illuminating light 12 and the imaging light for the imaging of the subregion 8 onto the detector 5.

Figure 2:
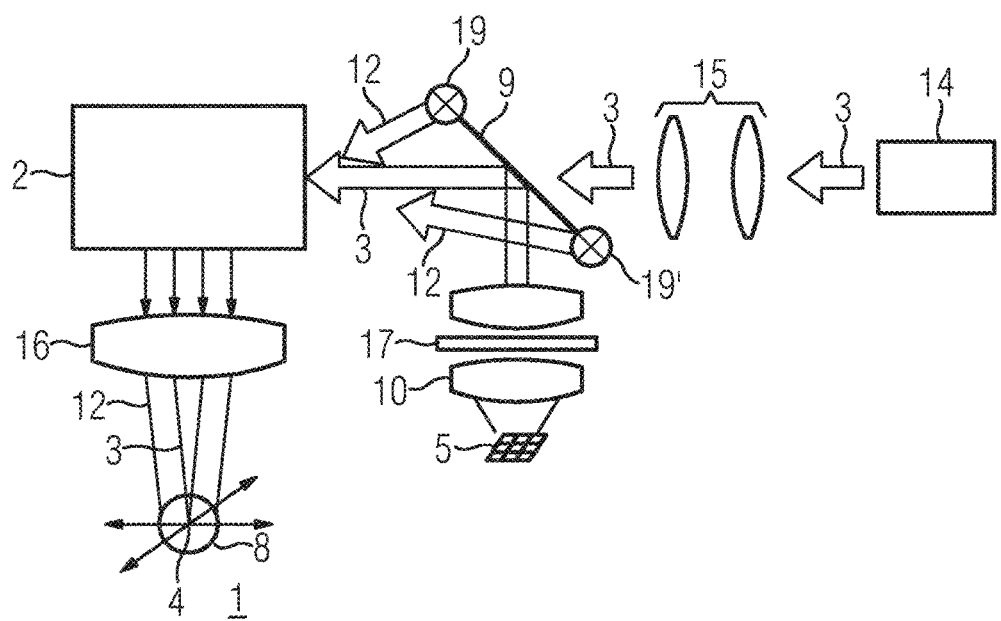
FIG. 2 shows a further example embodiment of a device.

In FIG. 2, a schematic representation of a further embodiment given by way of example of the device is shown.

The embodiment of FIG. 2 differs from that in FIG. 1 in that the illuminating device 11 has further light sources 19, 19' that may couple the illuminating light 12 directly into the beam path of the fusing beam 3. For this purpose, the light sources 19, 19' are for example arranged around the beam path of the fusing beam 3 (e.g., at the beam splitter 9).

In such embodiments, it is possible to dispense with the further beam splitter 26.

Figure 3:
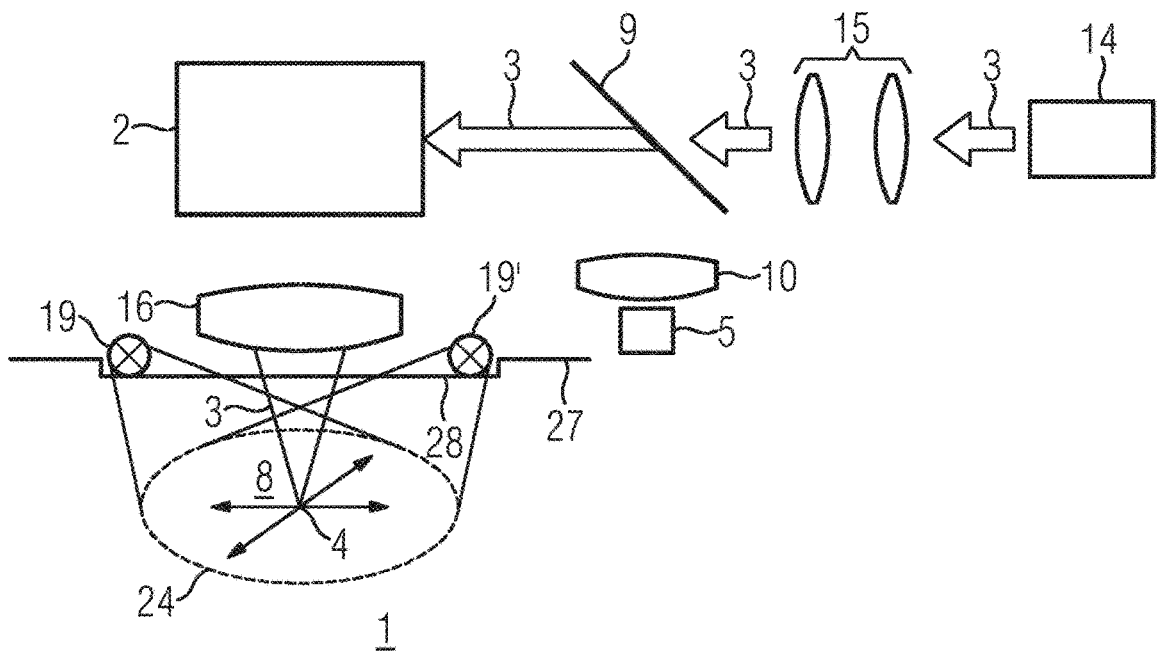
FIG. 3 shows a further example embodiment of a device.

In FIG. 3, a schematic representation of a further embodiment given by way of example of the device is shown.

The embodiment of FIG. 3 differs from that of FIG. 2, for example, in that the further light sources 19, 19' are arranged between the scanning unit 2 and the powder bed 1 (e.g., outside a working space housing 27, within which the powder bed 1 is arranged). The further light sources 19, 19' may, for example, direct the illuminating light 12 through a covering window 28 of the working space housing 27 directly onto the powder bed 1. An illuminating region 24 may consequently cover large parts or the entire powder bed 1 and the workpiece.

As is directly evidence to a person skilled in the art, individual features (e.g., the various exemplary embodiments of the illuminating unit 11 as shown in FIGS. 1-3) may be combined in any desired way.

Figure 4:
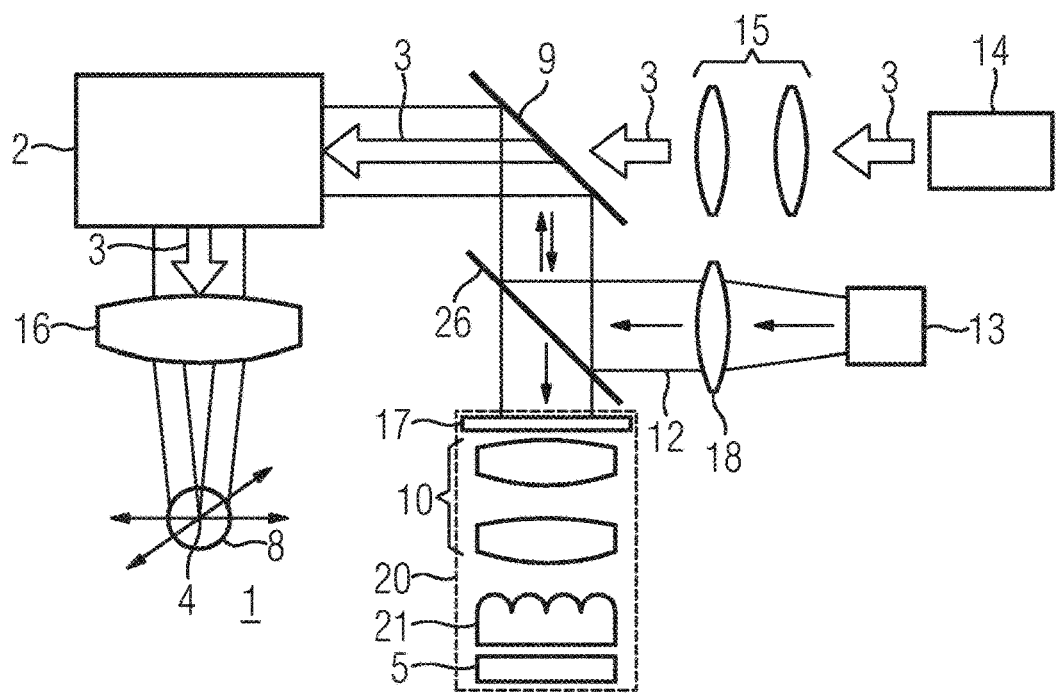
FIG. 4 shows a further example embodiment of a device.
Figure 5:
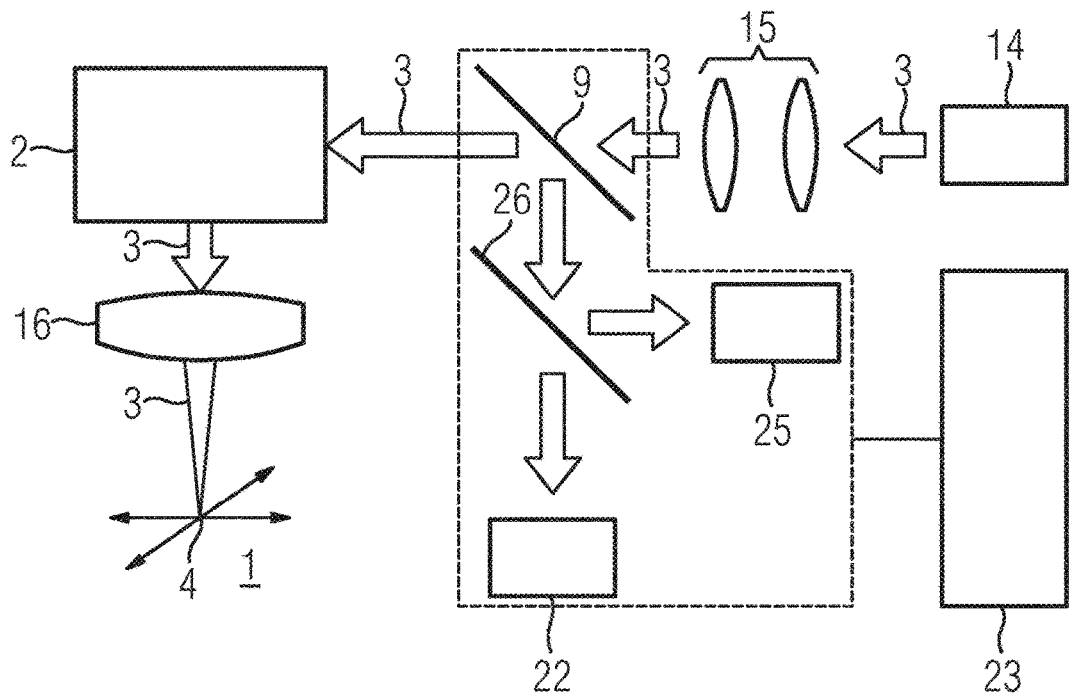
FIG. 5 shows a further example embodiment of a device.
Figure 6:
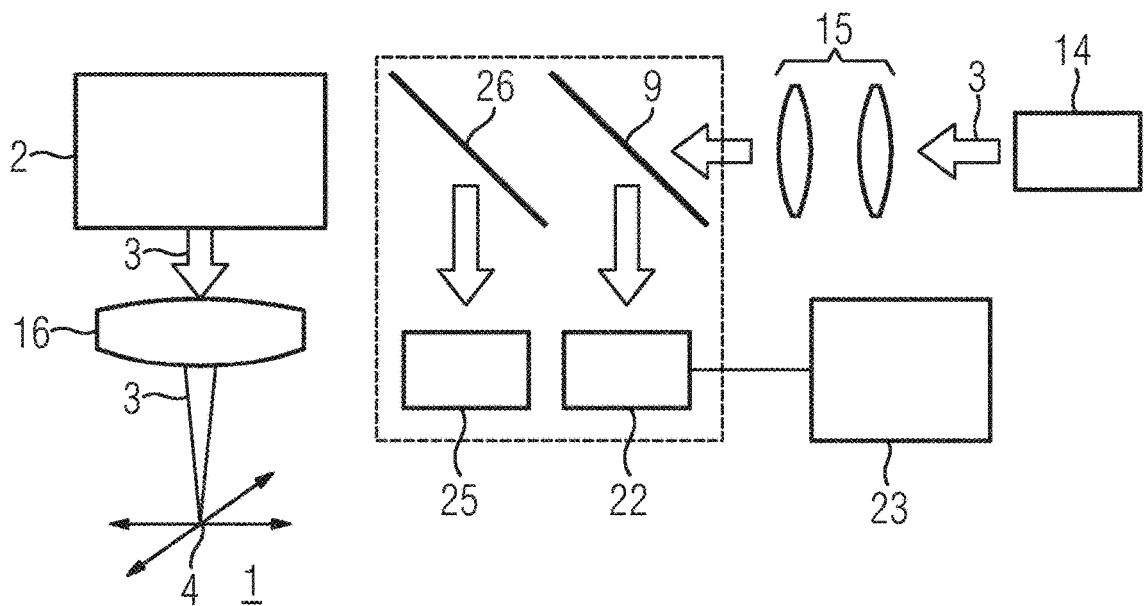
FIG. 6 shows a further example embodiment of a device.

The devices as shown in FIGS. 1-3, or else in FIGS. 4-6, may be used, for example, for monitoring additive manufacture and/or for process control of additive manufacture according to respective methods based on the improved concept.

For example, process monitoring and process control may be carried out in real time, or almost in real time (e.g., online) by the device based on the improved concept.

According to a device as shown in FIGS. 1-6, the imaging unit 11, which includes, for example, an imaging optical system, is used to image the subregion 8 (e.g., the subregion 8 around the tracing point 4 onto the spatially resolved detector 5). In a way corresponding to a resolving power of the optical system used, which is dictated, for example, by an available numerical aperture, a pixel size chosen to be at least half as great as a resolution limit determined based on a Rayleigh or Sparrow criterion may be achieved. During scanning with a resolution of, for example, 10 µm, in the case of a sensor size of the detector of 10 megapixels and an average edge length of approximately 3000 pixels, a recording region of an edge length of over 30 mm, (e.g., a surface area of around 10 cm$^2$) is obtained. In the case of methods for additive manufacture from a powder bed, a grain size of a powder for the manufacturing (e.g., a metal powder) lies, for example, in a range of about 10 µm. Other parameterizations are, for example, possible to obtain optimum imaging conditions in other specific applications.

As shown in FIGS. 1-6, the light for the imaging on the detector may be branched off from the beam path of the fusing beam 3 by the beam splitter 9. Due to the arrangement of the beam splitter 9 between the heat source 14 and the scanning unit 2, the optical system always remains centered in relation to the fusing beam 3 (e.g., independently of a deflecting state of a deflecting mirror of the scanning unit 2 in the respective tracing process). The location of the fusing beam 3 may be arranged in a central region of the detector image, since it is here that the tracing process then takes place and (e.g., in the case of SLM) forms a melting region ("melt pool").

The optional illuminating system allows particularly high-grade images to be recorded. An illuminating wavelength may in this case be adapted to a sensitivity range of the detector 5.

The illuminating unit may be formed such that the illuminating unit may be switched on and off, so that, in the switched-on state, for example, the entire field of view may be illuminated with a basic illumination. Since a tracing region and regions surrounding this tracing region in the powder bed 1 or on the workpiece may also radiate in the infrared range or in the visible spectral range as a result of a correspondingly increased temperature, these regions may appear even brighter in the image. In the switched-off state of the illuminating unit 11, apart from possible ambient light, then only the self-lighting of the tracing region and a surrounding area of the tracing region may be seen. This region may then, for example, be thermographically recorded and assessed in a corresponding temperature.

The subregion 8 therefore lights up as a result of the energy introduced by the fusing beam 3, because the heated material partly thermally radiates the energy again. Consequently, the brightness with which an object appears in the image in the detector 5 correlates with the temperature of this object (e.g., the subregion 8). This assignment of brightness to recording parameters, such as exposure time or magnification, or to settings of an imaging optical system, such as, for example, aperture or stop, or material parameters, such as material, grain size, emissivity of the powder or of correspondingly fused material, may be recorded with a thermometric calibration and then used for measuring (e.g., thermometric measuring).

With the thermometric measuring, it is possible, for example, to convert a brightness distribution in the image directly into a temperature distribution of the workpiece, so that a thermal profile of the workpiece may be detected and measured with a device according to the improved concept in a region around the fusing beam 3 (e.g., in the subregion 8).

If the emissivity of the powder differs from that of the sintered or melted material, it may be advantageous and expedient first to analyze the image by image processing before applying the thermometric calibration in order to determine which image regions are covered with powder and which are covered with sintered or melted material. After that, for example, the respective thermal calibration may take place with respect to the types of material present.

As a result of the processing, it is possible, for example, in the case of SLM methods for sintered material to occur at the edge of a tracing path (e.g., if the energy or temperature was not sufficient for complete melting and the material was only incipiently melted, and thus adjacent powder particles were sintered). It may be generally advantageous for meaningful thermometric calibration to distinguish between a number of types of material in a way corresponding to the material configurations that are distinguishable in the camera image (e.g., in the image on the detector 5), and then to provide specific individual thermal calibrations for these. If types of material are not directly distinguishable in this way, it may also be advantageous to make the material assignment, for example, on the basis of a lateral distance from the tracing path, because it may possibly be known a priori, for example from laboratory or tracing trials, how different material composites are obtained at a distance from the tracing path.

For optically distinguishing the material, it may be advantageous to illuminate a viewing region of the detector 5 with unpolarized, polarized, or partially polarized light of a known polarization state and to record the image with a polarization-sensitive camera. A polarization-sensitive camera may be, for example, a camera that has a polarization-sensitive camera chip of a corresponding structure. Alternatively, a camera in which a polarization filter 17 is arranged before a conventional camera chip may be provided, the polarization filter may be on a path of the beam between the beam splitter 9 and the camera chip (e.g., the detector 5), either having been introduced into the beam path or possibly being variable in the direction it may be passed through, so that, with different settings of the polarization filter 17, the polarization state of the light from the object region becomes measurable.

Instead of distinguishing the material behavior based on the changing of the polarization state in the reflected light in comparison with the radiated-in illuminating light 12, a reflection behavior of the subregion 4 may also be used. If one has, for example, a structured illumination that, for example, contains two grid patterns that are, for example, turned with respect to one another by a fixed angle (e.g., 45°), and one of the grid patterns is projected sharply onto a surface of the powder bed 1 of the workpiece while the other pattern is radiated diffusely, a type of material (e.g., in powder form or melted) may be identified based on the reflection quality using deflectrometry or structured-light projection and the respective degree of reflection or the contrast.

The imaging of the subregion 8 on the detector 5 may be performed, for example, with a camera that includes the detector 5.

A record of the image taken with the camera may be coupled with the fusing beam 3 or the imaging unit 2 in order as far as possible only to record an image with a light flash, in order that blurring of the image content, or instances of unsharpness of the movement or motion blurring, are not caused by a movement of the fusing beam 3, and consequently also of the observation beam path, as a result of the beam deflection in the imaging unit 2.

In principle, motion blurring may be compensated by known motion deblurring methods. For this, a relative movement between the subregion 8 and the camera are to be known, so that, consequently, at least relatively large structures are better identifiable and may be better represented in a contrasted manner.

As an alternative or in addition, the detector 5 and/or the lens system 10 may be equipped with one or more actuators (not shown), so that a readjustment of the lens system 10 and/or of the detector 5 or of the camera may be performed in a way corresponding to a movement of the tracing beam 3. For this purpose, for example, a current position of the imaging unit 2 or of a deflecting mirror of the imaging unit 2 or a position of the tracing point 4 may be known, so that the items of movement information may be determined from a corresponding location signal.

In one embodiment, the detector 5 may, for example, be formed as a camera sensor that is movable with respect to the lens system in a direction within a detector plane. Movability perpendicularly to the detector plane may likewise be advantageous, for example to compensate for defocusing due to the scanning system 2 or the f-theta of the focusing unit 16 (e.g., at edges of the field of view). With a readjustment of the detector 5 perpendicularly to the detector plane, the focus may then be readjusted in the best possible manner.

In addition to the movability of the detector 5, the detector may, for example, be equipped with a cardanic suspension with an effective rotation point in the middle of the detector 5. This may be advantageous because it is then also possible to compensate for an inclination of the subregion 5 in relation to the optical axis over the working region of the device. If, for example, the distance of the rotation point from the detector surface is chosen to match a magnification ratio of the focusing unit 16 or a deflection by the scanning unit 2 or magnification by the imaging optical system, complete correction of the displacement, inclination, and focus is possible with just three drives for the detector 5.

As an alternative or addition to the movements of the detector 5 mentioned, other compensation elements may also be provided. Thus, for example, tilting of the image may also be achieved by decentering of at least one lens or group of lenses in the imaging optical system, or special correction elements for the displacement and correction of the possible aberrations (e.g., astigmatism or spherical aberrations) may be provided for this purpose. These elements may be formed, for example, with a plate (e.g., a plane-parallel plate) that may be tilted about two axes or may be turned, for example, about an optical axis and may be tilted perpendicularly to the optical axis, in the imaging optical system between the beam splitter 9 and the detector 5. With suitable design of the geometry, the tiltable plate may, at least to the greatest extent, correct both a focal position and the aberrations due to the possible inclined beam path of the fusing beam 3 in relation to the tracing location 4.

In the case of a configuration with turning and tilting, two oppositely arranged wedge plates that are, for example, tiltable with respect to one another about an axis parallel to the vertex axis of the wedge plates, may be provided instead of the tiltable plate. It is in this way also possible to achieve a beam deflection of the fusing beam 3 that may be set and may compensate for the inclination of the imaging beam with respect to the subregion 8 or the powder bed 1 and allows the image on the detector 5 to be set sharply over the full surface area.

In the case of additive manufacturing methods such as, for example, SLM or SLS, great heating of the material takes place, so that thermal radiation of the subregion 8 may already be detected by cameras in the near infrared or visible spectral range. Alternatively, cameras with sensitivities in the infrared range or thermoelectric cameras for near infrared and/or far infrared may also be used.

In order to minimize or rule out a retroactive effect of the fusing beam 3 on the image on the detector 5, the filter 17 may include a dichroic filter or a narrowband notch filter (e.g., adapted to a wavelength range of the fusing beam 3) for a wavelength of the fusing beam 3. As an alternative or in addition, a corresponding filter may be arranged in the beam splitter 9. If the fusing beam 3 contains polarized light, the polarization may also be used for efficient filtering.

Using the device according to FIGS. 1-6, detection may also take place, as described, in regions adjacent to the current tracing point 4 (e.g., from earlier traced paths or else in the powder bed). With the knowledge of the temperature in the workpiece, the current tracing process may then also be adapted in its parameters such that, for example, a temperature profile that is as uniform as possible is achieved when tracing. Thus, for example, thermal stresses that may occur due to the local heating in the workpiece in the manufacturing process may be minimized.

Devices based on the improved concept according to FIGS. 1-6 allow surface-area imaging of the subregion 8 around the tracing point 4. Imperfections such as defects, flaws, excess material, spatter, and so forth (e.g., directly before the tracing point 4 and also in an overlapping region) may be detected.

Further, a thermal two-dimensional image in which a temperature profile in the subregion 8 becomes measurable may be generated. Correspondingly, adapted control of fusing beam power may be achieved for the most homogeneous possible temperature control at the tracing point 4 and in the subregion 8. A topography of the subregion 8 may also be detected by three-dimensional methods such as structured-light projection or deflectometry.

As an alternative to the embodiments shown in FIGS. 1-6, in which the light for imaging the subregion 8 on the detector 5 has been coupled out from the beam path of the fusing beam 3, a camera with the detector 5 may also be directed directly into the working space and, for example, with the camera's own kinematics, follow the fusing beam 3 or the tracing point 4. For example, the fusing beam 3 may in this case be followed by a procedure based on image processing. In this case, with corresponding activation, motion blurring may also be avoided.

FIG. 4 schematically shows a further embodiment given by way of example of a device according to the improved concept. The basic structure of the device corresponds to that shown in FIG. 1.

The device according to FIG. 4 includes a light-field camera 20, also referred to as a plenoptic or multiple-aperture camera. The light-field camera 20 includes the detector 5, the lens system 10, and also the optional filter 17.

Further, the light-field camera 20 includes, for example, an array of micro-lenses 21, that are arranged between the lens system 10 and the detector 5. Using the micro-lenses 21, a corresponding imaging beam path is divided into subapertures. For each of these subapertures, a separate image is then produced on the detector 5, with slightly different viewing angles each, as a result of the spatial offset of the micro-lenses 21. A spatial structure of the subregion 8 may then be calculated from the slightly different subimages using methods of triangulation, and two-and-a-half-dimensional or three-dimensional images are produced. In order to further improve a depth measurement, different focal lengths may be used for different lenses of the micro-lenses 21, respectively. For this purpose, lenses with two, three, or more different focal lengths may be used.

As a difference from conventional triangulation or light-section methods, such as structured-light projection or laser triangulation, an asymmetrical preshaping at edges as a result of the prescribed direction of triangulation and the structure of the hardware may be avoided using the light-field camera.

In some embodiments, the light-field camera 20 may monitor the entire powder bed 1 and workpiece in one record. A setting of the light-field camera 20 during manufacture may then remain fixed or constant.

In other embodiments, the light-field camera 20 may be directed specifically onto regions of the powder bed 1 (e.g., onto the subregion 8), and these may be inspected with correspondingly high resolution.

For example, for this purpose, the imaging beam for the light-field camera 20 may be guided at least partially coaxially with the fusing beam 3 and impinge on the powder bed 1 coaxially with the fusing beam 3. This is the case in the embodiment given by way of example of FIG. 4.

If pivoting movements are used when changing the position of the subregion 8, an optical axis of the imaging optical system is inclined in a way corresponding to the pivoting movements, and consequently, so is the sharply imaged object plane of the optical system, which is, for example, perpendicular to the optical axis. Consequently, the image sharpness of the imaging changes along the direction of the plane of incidence of the imaging beam. Since, however, the light-field camera 20 (e.g., in the version with the microlenses 21 of different focal lengths) may sharply image a very much greater depth of field range, this unsharpness may be fully or partially compensated.

The imaging onto the detector 5 of the light-field camera 20 may be digitally refocused, which has the consequence that, depending on the present tilting position of the optical axis in relation to a workpiece surface or a surface of the powder bed 1, a sharp image may be calculated for an image plane that is lying obliquely in relation to the optical axis and is conjugate with the tilted object plane via the optical system. As an alternative or in addition, a three-dimensional point cloud of measurement data of the light-field camera 20 may be determined and may then represent the tilted object plane (e.g., together with a topography of individual features in the subregion 8, such as elevations or depressions; material spatter on the powder bed 1 or holes in the powder bed 1). It may also be advantageous for tilting of the data in the three-dimensional point cloud if tilting caused purely by a viewing direction is calculated out of the data set. The data may therefore be represented in a reference coordinate system (e.g., a workpiece coordinate system or machine coordinate system).

Compensation of the tilting angle in the image record (e.g., in one of the ways described) is also advantageous for bringing together measurement data either of the three-dimensional images or of the three-dimensional point cloud including the subimages into a coherent image made up of multiple subimages that have been recorded with difference tilting positions.

Images of the light-field camera 20 may be metrically calibrated, for example, for a fixed setting of the imaging lens system for the focal position and zoom. With metrically calibrated images, stitching may be better performed, because the distortions from the camera image may be minimized.

Instead of measuring different calibrating images, an effect of the optical system for different tilting angles of the beam, and associated effective beam axes, may also be ascertained by simulation and then taken into account, for example, in an evaluation. Combinations of measurement and simulation are also possible, for example, to make use of a time advantage of simulation and nevertheless to record a comparison with the specific system as completely as possible.

The light-field camera 20 may be constructed, for example, as a color camera or black-and-white camera, with a sensitivity range, for example, in the ultraviolet, visible, infrared, near-infrared, mid-infrared, and/or far-infrared spectral range. For an application in SLM or SLS methods, a version with a silicon detector may be advantageous, for example, with a sensitivity range of approximately 400 to 1100 mm.

According to devices as shown in FIG. 4, for example, a direction-dependent three-dimensional or two-and-a-half-dimensional recording of the subregion 8 may take place. The depth of field may, for example, be increased in order to be able to digitally compensate for instances of tilting of the imaging beam.

For example, distance control, from a tracing head to the workpiece surface, or to the powder bed 1, may take place almost in real time.

A three-dimensional thermal recording of the component, with or without thermal calibration, is likewise possible. With respect to the thermal recording and calibration, reference is made to the explanations in relation to FIG. 1-3.

In FIG. 5, a schematic representation of a further embodiment given by way of example of a device according to the improved concept is shown. A basic structure of the device corresponds to that of the device according to FIGS. 1-4.

The device includes a camera 25 that may, for example, correspond to the light-field camera 20 and/or may include the detector 5 according to FIGS. 1-3. Also shown is an evaluating unit 23 that is coupled with the camera 25. The evaluating unit 23 may, for example, record detector signals generated by the camera or the detector 5 and on the basis thereof control a manufacturing process for the additive manufacture.

Optionally, the device also includes a spectroscope or spectrometer 22 that may record light emanating from the subregion 8 and on the basis thereof generate spectral signals and supply the spectral signals, for example, to the evaluating unit 23.

FIG. 6 shows a further schematic representation of an embodiment given by way of example of a device according to the improved concept. The device of FIG. 6 largely corresponds to the device from FIG. 5.

While in FIG. 5 the beam splitter 9 is provided in order to couple out light from the beam path of the fusing beam 3 and direct the light onto the further beam splitter 26, which conducts light to the camera 25 and to the spectroscope or spectrometer 22, in FIG. 6, the two beam splitters 9 and 26 are arranged one behind the other in the beam path of the fusing beam 3 and independently of one another couple out light for the camera 25 or the spectroscope or spectrometer 22 from the beam path of the fusing beam 3.

A device according to FIG. 5 or FIG. 6 may be used, for example, for carrying out a method for process control according to the improved concept (e.g., as explained below with respect to FIGS. 7-9).

Figure 7:
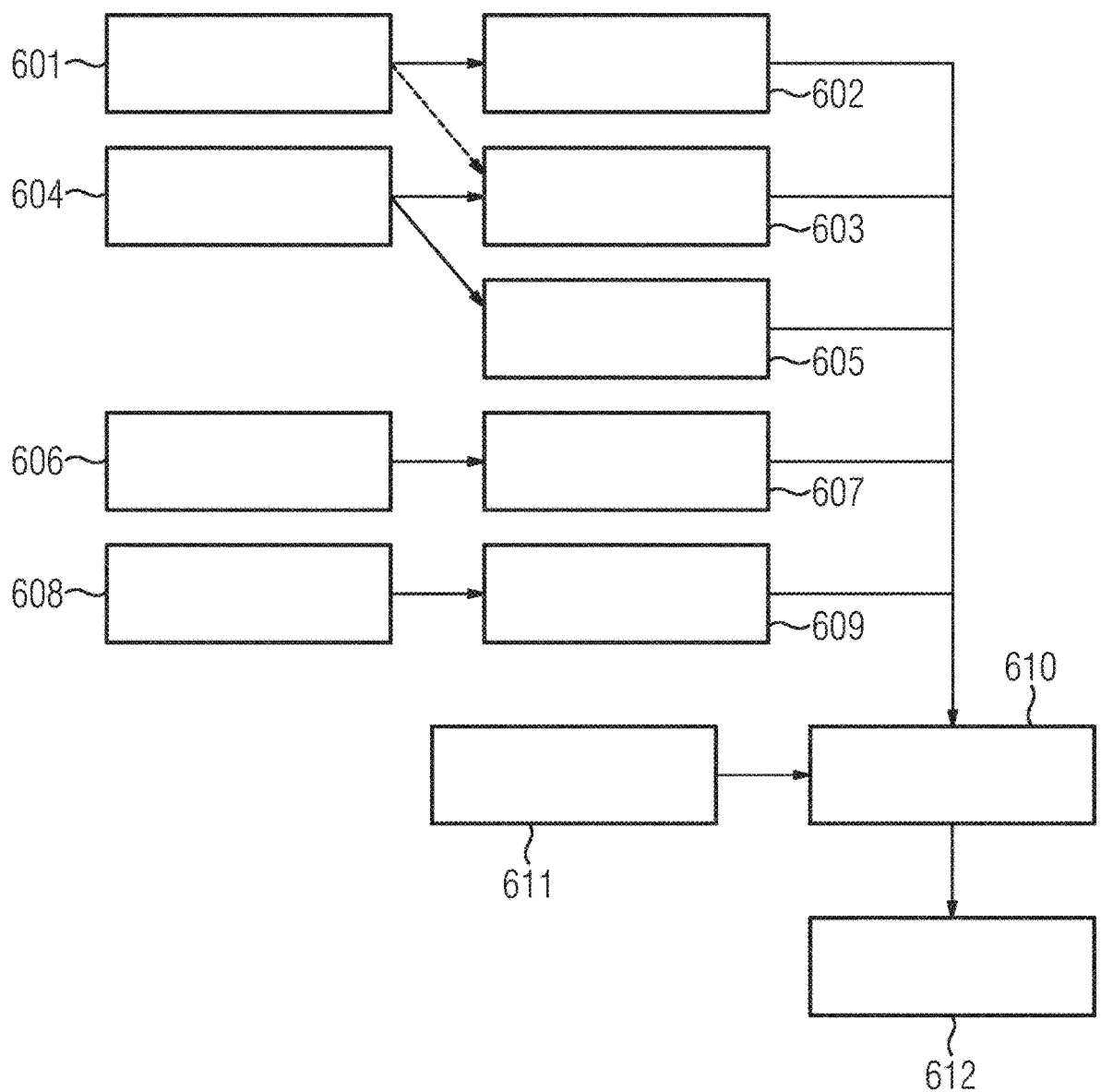
FIG. 7 shows a flow diagram of an example embodiment of a method for process control.

In FIG. 7, a flow diagram for the schematic representation of a method for process control according to the improved concept is shown. In act 601, detector signals from the detector 4, (e.g., containing items of two-dimensional, two-and-a-half-dimensional or three-dimensional information about the subregion 8) are recorded and, for example, transmitted to the evaluating unit 23.

In act 602, the evaluating unit 23 determines, for example, a topography of the tracing location 4 or the subregion 8.

The items of information from 601 are possibly used in act 603 to create a thermal profile of the tracing location 5 or of the subregion 8 (e.g., by the evaluating unit 23).

Optionally, in act 604, spectral signals from the spectroscope or spectrometer 22 may be transmitted to the evaluating unit 23. The spectral signals may, for example, be taken into account in the ascertainment of the thermal profile.

In an optional act 605, the evaluating unit 23 determines items of information concerning possible instances of contamination in the subregion 8 based on the spectral signals.

In an optional act 606, sound signals or acoustic signals (e.g., structure-borne sound signals) from a sound sensor of the device that is coupled with the workpiece are transmitted to the evaluating unit 23.

In an optional act 607, the evaluating unit 23 may determine items of information concerning the occurrence of cracks, stresses, or relaxations in the workpiece based on the sound data.

Optionally, in act 608, further sensors or measuring devices may record further measured variables and pass the further measured variables on to the evaluating unit 23. In an optional act 609, the evaluating unit 23 may generate, for example, derived items of process information based on the further measured variables.

The items of information, profiles, topographies, and so forth generated in acts 602, 603, 605, 607 or 609 may be used, for example, in act 610 for process control (e.g., for controlling a tracing process for manufacturing the workpiece by the device). For example, the evaluating unit 23 may calculate optimized tracing data with a current item of process information based on the items of information and data thus recorded. Deviations of a tracing path or of the tracing point 4 from target values may be minimized or compensated based on the optimized tracing data.

For example, the evaluating unit 23 may activate the heat source 14 and/or the scanning unit for controlling the tracing process.

Likewise in act 610, the evaluating unit may, for example, ascertain items of information or items of status information on potential deviations or faults and, for example, output the items of information or the items of status information to a user of the device, for example, via a user interface or a display unit.

In the case of certain serious faults, such as, for example, when tolerances are exceeded, when there are serious instances of contamination or when cracks occur in the workpiece, in act 610, the evaluating unit 23 may, for example, also abnormally terminate the tracing process. For example, for this purpose, the evaluating unit 23 may deactivate the heat source 14.

For calculating the tracing data (e.g., the optimized tracing data), for performing further acts described with respect to 610, the evaluating unit 23 may, for example in a act 611, also record target data or layer data for manufacturing the workpiece or, for example, CAD data and take this data into account in the required calculations.

In act 612, the evaluating unit 23 may activate various system components of the device directly or indirectly in order to control the process; for example, the evaluating unit 23 may activate a coating unit in order, for example, to determine or set a layer thickness for the coating after the actual additive manufacture of the workpiece.

In addition or as an alternative, the evaluating unit 23 may, for example, activate the heat source 14 such that energy of the fusing beam 3 is changed. As an alternative or in addition, the evaluating unit 23 may activate the scanning unit 2 in order correspondingly to compensate for or minimize the deviations. As an alternative or in addition, the evaluating unit 23 may also activate the focusing unit 16 (e.g., the f-theta lens) in order to correct a focus.

Figure 8:
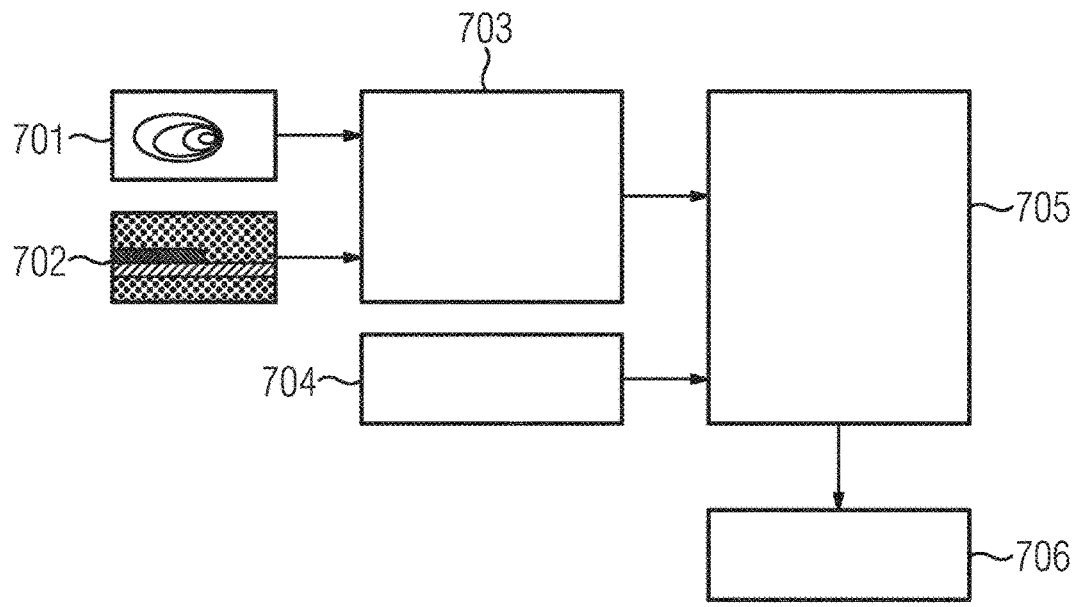
FIG. 8 shows a flow diagram of a further example embodiment of a method for process control.

In FIG. 8, a flow diagram of a further embodiment given by way of example of a method for process control according to the improved concept is shown. In act 701, a thermal image (e.g., of a melting region or of the tracing location or of the subregion 8) is transmitted to the evaluating unit 23. Optionally, in act 702, a surface image (e.g., a two-dimensional and/or two-and-a-half-dimensional and/or three-dimensional surface image) of the powder bed 1 or of the subregion 8 may be transmitted to the evaluating unit 23.

In act 703, the evaluating unit 23 may, for example, determine a temperature profile or isotherm based on the thermal image.

On the basis of the surface image, in act 704, the evaluating unit 23 may, for example ascertain an item of topography information of the subregion 8 and, for example, detect holes, spatter, other structures or powder remains.

In act 705, the evaluating unit 23 may, for example, determine an amount of energy of the fusing beam 3 that is required or is to be adapted (e.g., from the temperature profile or from the surface image of the subregion 8). As an alternative or in addition, the evaluating and 23 may also determine an operating mode of the heat source 14 (e.g., for optimizing a temperature profile before a tracing operation or, location-dependently, in alternation with the tracing operation).

In act 706, the evaluating unit 23 may, for example, activate the heat source 14 and/or the scanning unit 2 and/or the focusing unit 16 (e.g., for adapting the manufacturing process). For example, in act 706, the evaluating unit may switch over between different operating modes of the device (e.g., between a heating mode and a tracing mode).

The act 705 may also, for example, optionally be assisted here by CAD data or layer data or target data from act 704.

Figure 9:
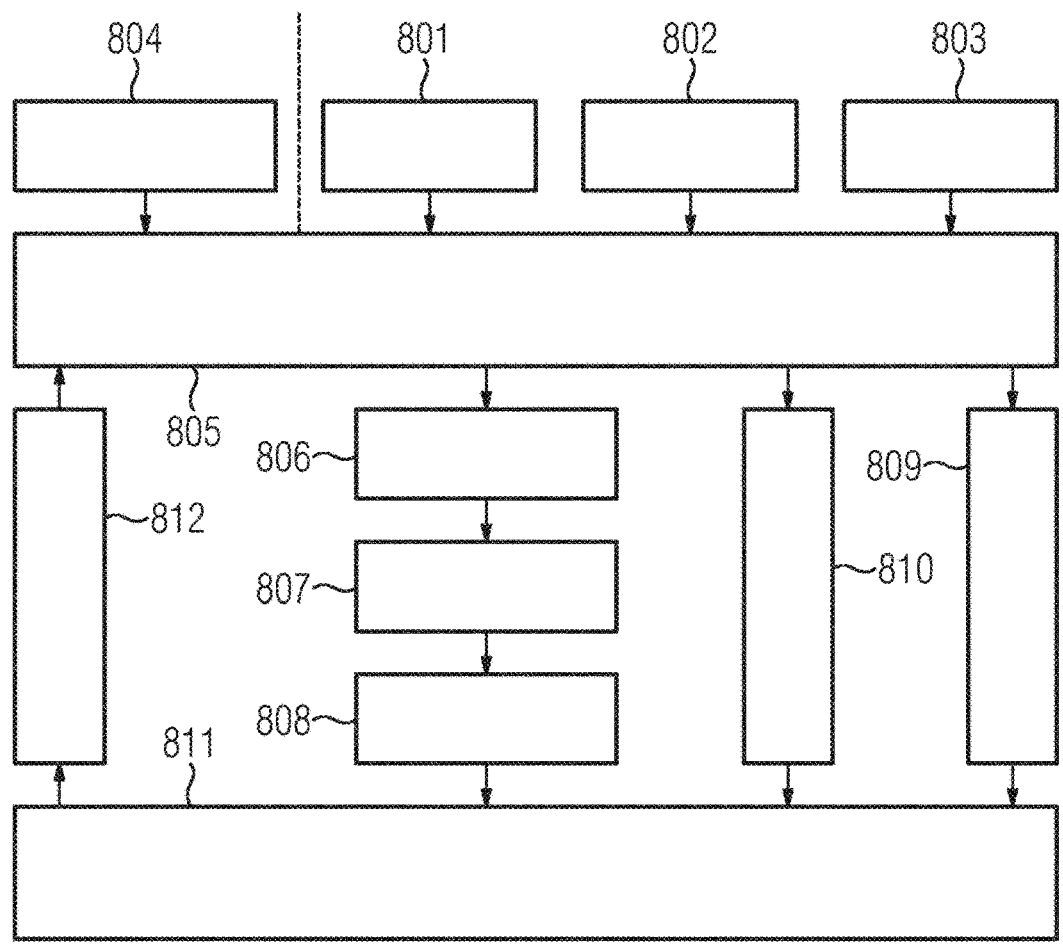
FIG. 9 shows a flow diagram of a further example embodiment of a method for process control.

In FIG. 9, a flow diagram of a further embodiment given by way of example of a method for process control according to the improved concept is shown. Act 801 corresponds to act 701 in FIG. 8. Act 802 corresponds to act 702 in FIG. 8. In act 803, for example, further data such as sensor data, further measured variables, sound signals and/or spectral signals may be transmitted to the evaluating unit 23. Act 804 corresponds to act 704 in FIG. 8.

In act 805, the evaluating unit 23 may carry out act (e.g., calculation acts) for thermal process management. For example, the evaluating unit 23 may determine a dynamic determination of one or more process parameters. The evaluating unit 23 may, for example, activate one of a number of operating modes of the device (e.g., a tracing mode, a tracing-and-heating mode, or a heating mode).

In act 806, the manufacture of the workpiece may then be carried out. In act 807, quality testing of the workpiece may take place. In act 808, for example, deviations of actual values of the workpiece from target values may be determined, and/or defects of the workpiece may be determined.

In an optional act 809, for example, data from measurements accompanying the manufacture may be provided. In an optional act 810, manufacturing parameters may be provided.

In act 811, the evaluating unit may, for example, carry out optimization of the model for a dynamic determination of process parameters based on the deviations or defects determined in act 808 and optionally from the data from 809 and the parameters from 810. For example, structural elements and/or morphologies may be determined. The adaptation of the model may take place, for example, component-specifically or region-specific.

In a feedback act 812, the optimized adapted model may, for example, be taken into account in the thermal process management for the future manufacture of a further workpiece.

In a method for process control according to the improved concept, it may be provided that the signals of further, previously unmentioned sensors or else control or positioning signals or items of information enter processing of the respective measurement data for the purposes of process control.

Process control according to the improved concept uses these items of information concerning the tracing process or the workpiece itself in order to control the tracing process such that the decisive tolerances of the workpiece are minimized and moreover, for example, also a thermal load and/or temperature gradients in the component are minimized or kept as stable and controlled as possible. As a result, stresses in the workpiece may be minimized.

Measurements with further sensors also serve, for example, for even more complete recording of the tracing process with respect to further parameters and variables influencing the quality of the workpiece. For example, the sound measurement is described here.

The process control based on the improved concept allows more precise use of the present items of information to improve the manufacturing result. Process control may, for example, adopt items of geometrical information from the imagings of the subregion 8 in order, for example, to monitor and control a focal position or a height positioning in the process. The height control may be used for also indirectly influencing, for example, a depth effect of the tracing process. Thus, for example, more complex structures, such as overhangs or undercuts, which may occur in typical workpieces, may be manufactured with higher precision.

The layer thickness of the next layer may be set such that, for example, flaws of the current layer may be reliably filled or protruding parts do not conflict with or have a disturbing effect on the coating process. Typically, such disturbances may build up over a number of layers before there are disturbances in the process. Such disturbances may thus be intercepted by an early correction or countermeasure in such a way as to avoid disturbances of the process.

Heating power or an energy input or laser power (e.g., of the fusing beam 3) may be controlled such that the tracing point 4 has a desired lateral extent. For example, working may be carried out in a controlled manner in the workpiece and within a layer with tracing points 4 of different sizes in such a way as to optimize the manufacturing result.

Geometrical guidance of the fusing beam 3 may, for example, be monitored such that geometrical distortions in the manufacturing process may be corrected online. Possibilities for geometrical fusing beam guidance on the basis of two-dimensional or three-dimensional recording of the subregion 8 are described.

Further, a position and size of structures or adjacent tracing paths may also be determined and taken into account for process control.

The process control also reverts, for example, to the items of thermal or spectrographic information and signals (e.g., in order to achieve the most homogeneous or stable temperature possible in the tracing region, to minimize thermal gradients, and/or to create a depth profile for the local introduction and dissipation of heat). Further, material changes may be detected (e.g., oxidation from earlier overheating). Foreign materials may also be detected.

Further items of sensor information (e.g., sound signals) may, for example, be taken into account in order to detect crack formations or to detect spatter and/or to determine further manufacture-relevant or process-relevant parameters.

The process control uses the items of information mentioned and possibly further items of information from machines and/or material-specific specifications or else items of geometry information (e.g., from CAD data) in order to allow optimized process management by deterministic and/or learned assessments and/or modelings.

According to the process control of one or more of the present embodiments, collected items of information from the manufacturing sequence for the entire workpiece or else for subregions of the workpiece may be analyzed in a detailed manner (e.g., in order to further optimize the process management, for further similar parts or else for modular or recurring structural elements in the case of comparable workpieces).

An analysis (e.g., concerning crack formation or material changing or other quality criteria or instances of material contamination) may be used in addition to the analysis of purely geometrical deviations in order to stop or abnormally terminate a manufacturing order that is in progress as soon as, for example, it is likely or evident that the manufactured workpiece may no longer satisfy existing quality criteria.

If the tracing process has been stopped, a single- or multi-stage heating-up process may also be performed according to the process control, where, using the fusing beam 3, for example, only the workpiece is successively heated up with increasing power until a temperature distribution favorable for a stable tracing process and a corresponding cooling behavior have been achieved.

This method may also be used when hybrid manufacturing methods are used (e.g., when a further part is to be built onto an existing part or a semifinished product or fabricated in a stable material composite by the additive manufacturing method). Such scenarios may occur in the case of repair and maintenance, where regions have become damaged by wear or removed in the repair process and are to be made good.

Similarly, simple semifinished products involving classical manufacturing methods, such as casting, forging, turning, milling, pressing in various specific configurations, may typically be combined with a serial additive method.

With process control according to the present embodiments (e.g., using the controlled preheating) more filigree and more individual subregions may, for example, be added onto a prefabricated semifinished product.

The elements and features recited in the appended claims may be combined in different ways to produce new claims that likewise fall within the scope of the present invention, Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device for additive manufacture of a workpiece, the device comprising:
   a scanner configured to direct a fusing beam onto a tracing point on a tracing surface;
   a light-field camera that has a spatially resolving optical detector;
   an imaging device configured and arranged to image a subregion of the tracing surface at least two-dimensionally using the spatially resolving optical detector, the spatially resolving optical detector being configured to generate at least one detector signal based on the image of the subregion, wherein the imaging device includes a beam splitter that is arranged on an input side of the scanner in a beam path of the fusing beam;
   a controller configured to activate the device to change a position of the subregion during manufacture; and
   a processor configured to evaluate, process, or evaluate and process the at least one detector signal,
   wherein the beam splitter is configured to allow light that impinges on the beam splitter from the subregion via the imaging device to be coupled out and directed onto the spatially resolving optical detector.

2. The device of claim 1, wherein the imaging device includes an actuator configured to readjust the spatially resolving optical detector, a lens system of the imaging device, or the spatially resolving optical detector and the lens system of the imaging device in a way corresponding to a deflection of the fusing beam by the scanning unit for the imaging of the subregion.

3. The device of claim 1, further comprising an illuminating device configured to at least partially illuminate the subregion.

4. The device of claim 3, wherein at least one light source of the illuminating device is arranged and configured to couple light for the illumination on an input side of the scanning unit into a beam path of the fusing beam.

5. The device of claim 4, wherein at least one further light source of the illuminating device is arranged between the scanning unit and the tracing surface.

6. The device of claim 1, wherein the processor is further configured to ascertain at least one thermal characteristic of the subregion based on the at least one detector signal.

7. The device of claim 1, wherein the processor is further configured to determine an item of topographical information of the subregion based on the at least one detector signal.

8. The device of claim 1, wherein the processor is further configured to determine a deflecting position of the fusing beam based on the at least one detector signal.

9. The device of claim 1, further comprising:
   a spectroscope, a spectrometer, or a combination thereof that is configured and arranged to record light emanating from the tracing surface and generate on the basis thereof a spectrometer signal that includes items of spectrometric or spectroscopic information about the light;
   one or more sound sensors that are coupleable with the workpiece; or
   a combination thereof.

10. A method for additive manufacture of a workpiece, wherein, for the additive manufacture, a fusing beam is directed onto a tracing point on a tracing surface, the method comprising:
   recording, by an imaging device, an at least two-dimensional spatially resolved image of a subregion of the tracing surface using a spatially resolving detector of a light-field camera, wherein a position of the subregion is changed during the manufacture, and wherein the imaging device includes a beam splitter that is arranged on an input side of the scanning unit in a beam path of the fusing beam;
   generating at least one detector signal based on the image using the spatially resolving detector;
   monitoring the manufacture based on the at least one detector signal;
   evaluating, processing, or evaluating and processing the at least one detector signal,
   wherein the beam splitter is configured to allow light that impinges on the beam splitter from the subregion via the imaging device to be coupled out and directed onto the spatially resolving optical detector.

11. The method of claim 10, further comprising:
   ascertaining at least one thermal characteristic of the subregion based on the at least one detector signal; and
   fixing or changing at least one process parameter for the manufacture dependent on the at least one thermal characteristic.

12. The method of claim 11, wherein:
   a sound signal is recorded by a sound sensor coupled with the workpiece, and the fixing or changing of the at least one process parameter is carried out dependent on the sound signal;
   a spectrometer signal is generated based on light emanating from the tracing surface, and the fixing or changing of the at least one process parameter is carried out dependent on the spectrometer signal; or
   a combination thereof.

* * * * *